United States Patent
Parrish (10) Patent No.: US 9,844,298 B1
(45) Date of Patent: Dec. 19, 2017

(54) PUSH TO SEAR VALVE FOR A GAS GRILL

(71) Applicant: Daniel T Parrish, Austin, TX (US)

(72) Inventor: Daniel T Parrish, Austin, TX (US)

(*) Notice: Subject to any disclaimer, the term of this patent is extended or adjusted under 35 U.S.C. 154(b) by 416 days.

(21) Appl. No.: 14/558,716

(22) Filed: Dec. 2, 2014

(51) Int. Cl.
*A47J 37/07* (2006.01)
*F16K 11/065* (2006.01)
*F16K 35/02* (2006.01)

(52) U.S. Cl.
CPC ....... *A47J 37/0713* (2013.01); *A47J 37/0786* (2013.01); *F16K 11/065* (2013.01); *F16K 35/025* (2013.01)

(58) Field of Classification Search
CPC . A47J 37/0713; A47J 37/0786; F16K 11/065; F16K 35/025; F23N 1/00; F23N 1/007; F23N 2035/24
USPC .............. 126/14, 25 R, 39 N, 39 R, 52, 85 R
See application file for complete search history.

(56) References Cited

U.S. PATENT DOCUMENTS

| | | | | |
|---|---|---|---|---|
| 2,161,523 A * | 6/1939 | Moecker, Jr. | ........... | F16K 5/106 137/629 |
| 2,747,613 A * | 5/1956 | Reinhart | .................... | F16K 5/12 137/599.08 |
| 2,763,289 A * | 9/1956 | Mueller | .................... | F16K 5/10 137/599.08 |
| 3,001,547 A * | 9/1961 | Brumbaugh | .............. | F16K 5/10 137/614.17 |
| 3,564,929 A * | 2/1971 | Halstead | ................... | H03J 1/06 74/10.2 |
| 3,643,688 A * | 2/1972 | Meinert | ............... | B67D 1/0016 137/556 |
| 4,020,870 A * | 5/1977 | Carlson | ................. | F16K 5/0214 137/625.3 |
| 4,823,838 A * | 4/1989 | Ferlin | ................. | A47J 37/0713 137/624.12 |
| 4,947,891 A * | 8/1990 | Genbauffe | ............ | F16K 5/0207 137/599.17 |
| 5,009,393 A * | 4/1991 | Massey | ................. | F16K 5/0214 137/625.3 |
| 5,027,854 A * | 7/1991 | Genbauffe | ............ | F16K 5/0207 137/599.17 |
| 7,096,887 B2 * | 8/2006 | Tupa | ..................... | F16K 11/083 137/625.47 |
| 7,641,470 B2 * | 1/2010 | Albizuri | ................ | F16K 5/0214 126/39 E |
| 7,931,216 B2 * | 4/2011 | Chung | ................... | F16K 1/308 126/25 R |
| 7,942,164 B2 * | 5/2011 | Hsiao | ...................... | F23N 1/007 137/625.47 |
| 8,196,897 B2 * | 6/2012 | Albizuri Landa | .... | F16K 5/0214 126/52 |

(Continued)

*Primary Examiner* — Joshua Rodden (57) ABSTRACT

A gas grill is disclosed having a gas control valve with a push to sear feature. The gas control valve has a housing with a valve core rotatably disposed within the housing. A sear valve is disposed within the valve core. A user rotates the valve core within the housing to selectively align a gas inlet port with an inlet passage and to align a sear gas port and a sear gas flow passage. The sear valve has a sear valve element which is selectively movable relative to the valve core to selectively pass a sear gas through a sear gas port and a sear flow passage to the forward end of the valve housing, and then to the grill. A bias member, preferably a coil spring, is mounted between the sear valve element and the valve core for urging the sear valve element to a closed position.

20 Claims, 11 Drawing Sheets

(56) References Cited

U.S. PATENT DOCUMENTS

| | | | |
|---|---|---|---|
| 8,241,034 B2 * | 8/2012 | Deng | F23D 14/00 |
| | | | 126/116 R |
| 8,281,780 B2 * | 10/2012 | Carvalho | F23N 1/007 |
| | | | 126/25 R |
| 8,485,217 B2 * | 7/2013 | Zhang | F16K 5/0207 |
| | | | 126/52 |
| 9,200,807 B2 * | 12/2015 | Albizuri | F23N 1/007 |
| 9,410,701 B1 * | 8/2016 | Li | F23N 1/007 |
| 2006/0260603 A1 * | 11/2006 | Shah | A47J 37/0713 |
| | | | 126/41 R |
| 2008/0289615 A1 * | 11/2008 | Parrish | A47J 37/0713 |
| | | | 126/25 R |
| 2015/0157162 A1 * | 6/2015 | Parrish | A47J 27/62 |
| | | | 99/332 |

\* cited by examiner

PUSH TO SEAR VALVE FOR A GAS GRILL

CROSS-REFERENCE TO RELATED APPLICATION

The present application is related as a continuation-in-part application to application Ser. No. 14/541,020, filed Nov. 13, 2014 (now U.S. Pat. No. 9,560,928 issued Feb. 7, 2017), invented by Daniel Parish and Randall L. May, and entitled "QUICK SEAR BARBECUE GRILL AND COMPONENTS THEREOF," which claims priority under 35 U.S.C. §119(e) to U.S. Provisional Patent Application No. 61/913,179, filed Dec. 6, 2013, and entitled "QUICK SEAR BARBECUE GRILL AND COMPONENTS THEREOF," Mr. Daniel T Parrish is a common inventor with the above-listed application and the present application.

TECHNICAL FIELD OF THE INVENTION

The present disclosure relates in general to gas control valves, and more particularly to a dual fuel gas valve for various uses, including gas cooking grills.

BACKGROUND OF THE INVENTION

The function, operation, and the elements of prior art gas cooking grills are well-known. These gas grills utilize either liquid propane (LP) or natural gas (NG) as the gas source. Typically, in use, these gas grills include one or more gas control valves that control the flow of gas from the gas source to the burners. These gas control valves are typically structured and operate only to control one type of gas, either LP or NG. U.S. Pat. No. 8,613,276 and U.S. Pat. No. 7,967,005 disclose a gas control valves which are user adaptable for using either LP or NG for combustion in cooking grills.

When grilling it is often desirable to significantly increase the gas flow to the gas grill burners to provide a higher temperature to sear the surface of grilled food, caramelizing the meat to seal juices within the food being grilled. Conventionally, the gas flow to the grill may be increased prior to placing the food on the grill and then, after a brief period of time, be reduced to a lower temperature. However, instantaneous searing is typically not available in conventional control valves for gas grills due to limitations of the amount of gas which may be passed through conventional control valves for gas grills. Typically the gas flow through gas grill valves is limited by nozzle restrictions to only that which is necessary for conventional cooking. A significant flow of gas to flash into the grill to sear foods is not available from currently available gas grill valves.

SUMMARY OF THE INVENTION

A novel push to sear valve for a gas grill is disclosed. In one embodiment, there is provided a gas grill including a plurality of gas burners and a plurality of gas control valves. Each gas control valve has an inlet port operable for receiving gas from a gas source, an inner nozzle having a first orifice for outputting gas, and an outer nozzle having a second orifice for outputting gas, the second orifice adjacent the first orifice. The valve further includes a valve stem coupled to a valve core having one or more ports for receiving gas from the first inlet port and structured to direct gas from the first inlet port through a push to sear port. A restrictor mechanism may also be provided for restricting rotational movement of the valve stem and valve core of the valve.

The gas control valve is disclosed having a valve housing, a valve core rotatably disposed within the housing, and a sear valve disposed within the valve core. The valve housing has an interior cavity, a first inlet port operable for receiving gas from a gas source, and an inlet passage extending from the first inlet port to the interior cavity. A primary outlet port extends from the interior cavity. A sear gas flow passage extends from the interior cavity to a forward end of the housing. The inlet passage, the primary outlet port and the sear gas flow passage are spaced apart at the interior cavity. The valve core has a main body which includes an exterior periphery and a main chamber which is disposed interiorly within the main body of the valve core. A gas inlet port extends from the exterior periphery to the main chamber. A gas outlet port extends from the main chamber to the exterior periphery. A sear gas port extends from the main chamber to the exterior periphery. The valve core is mounted within the valve housing such that a user rotates the valve core within the valve housing to selectively align the gas inlet port with the inlet passage and to align the sear gas port with the sear gas flow passage.

The sear valve has a valve element which is selectively movable in slidable relation to the valve core, from a first position to a second position. In the first position the valve element prevents the sear gas flow passage from the main chamber of the valve core through the sear outlet port. In the second position the valve element is disposed such that the sear gas flow passes from the main chamber through sear gas port and the sear flow passage to the forward end of the valve housing, and then to a burner for the grill. The valve element has a head, an elongate body, and a seal element disposed adjacent the head and the elongate body for engaging with a seal surface disposed in fixed relation to the main body of the valve core. A stop ring is fixed on the elongate body for limiting a range of movement for the valve element within the valve core. A bias member, preferably a coil spring, is mounted between the valve element and the valve core for urging the valve element to the first position to prevent the sear gas flow through the sear gas port. A user selectively moves the valve element from the first position to the second position to thereby pass the sear gas flow from the main chamber, through the sear gas port and the sear gas flow passage to the forward end of the valve core.

Other technical features may be readily apparent to one skilled in the art from the following figures, descriptions, and claims.

DESCRIPTION OF THE DRAWINGS

For a more complete understanding of the present disclosure and the advantages thereof, reference is now made to the following description taken in conjunction with the accompanying Drawings, wherein like numbers designate like objects, and in which in which FIGS. 1 through 7B show various aspects for a push to sear valve for a gas grill, as set forth below:

DETAILED DESCRIPTION OF THE INVENTION

Figure 1A:
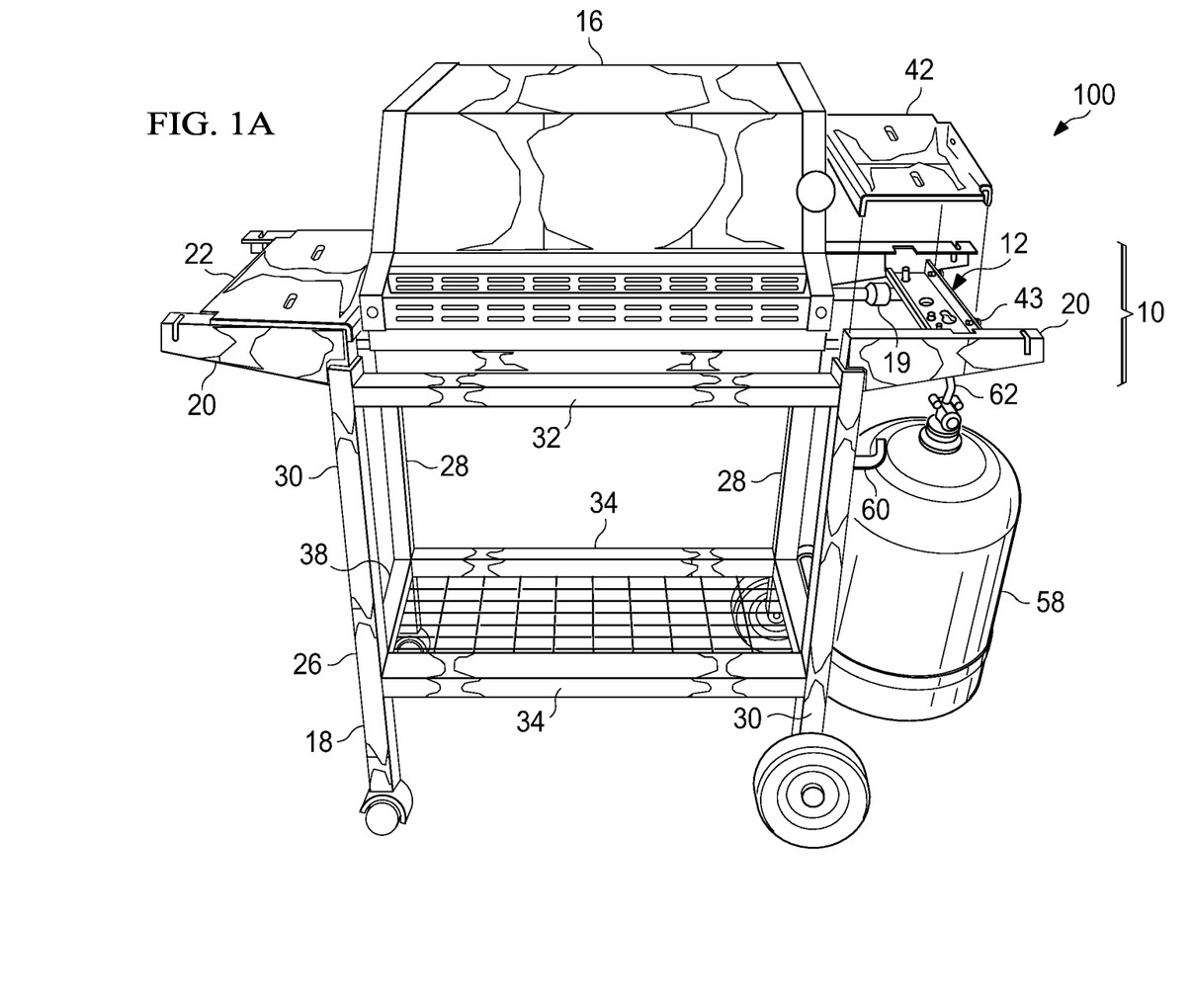
FIGS. 1A, 1B and 1C illustrate one embodiment of a gas cooking grill in accordance with the present disclosure.
Figure 1B:
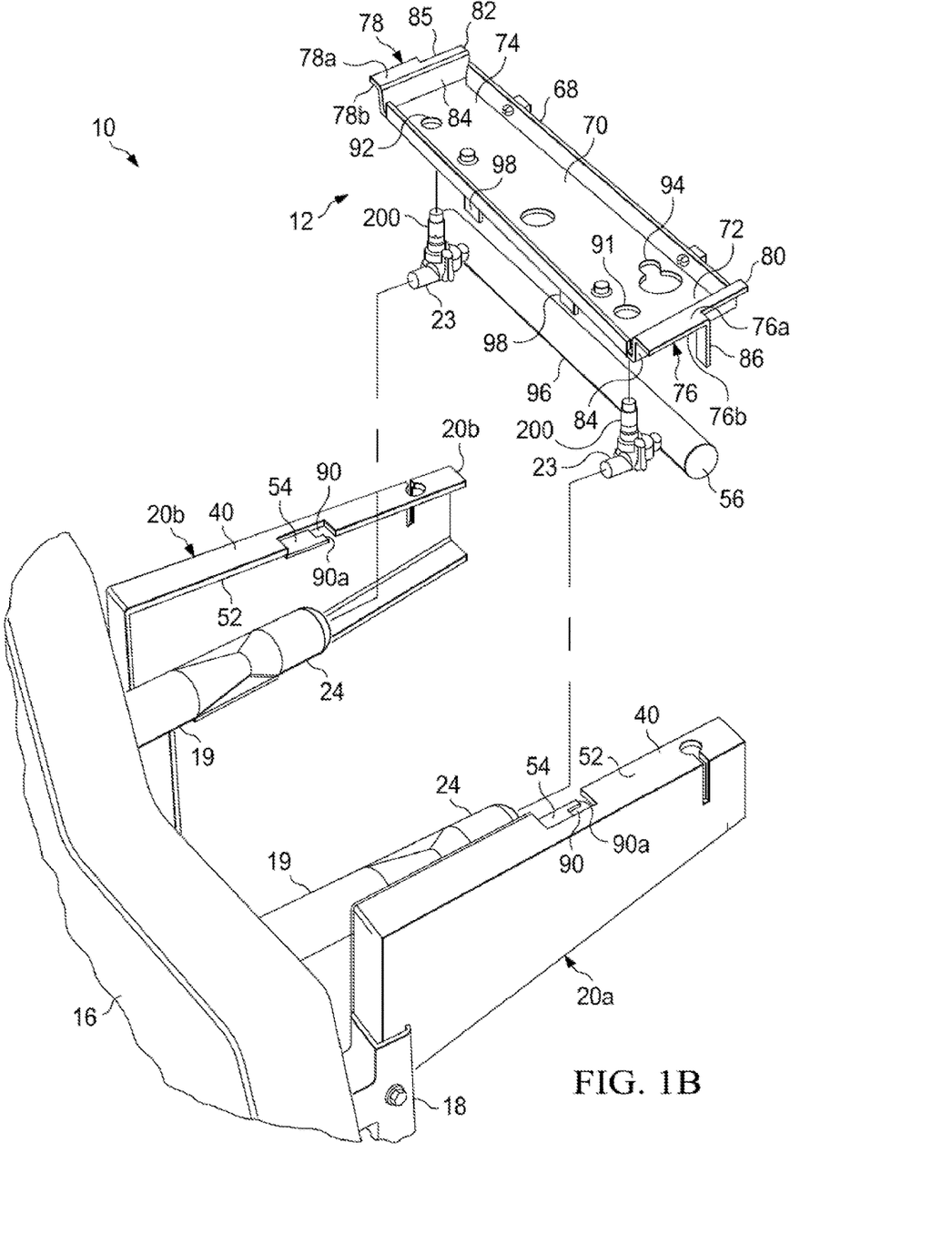
Figure 1C:
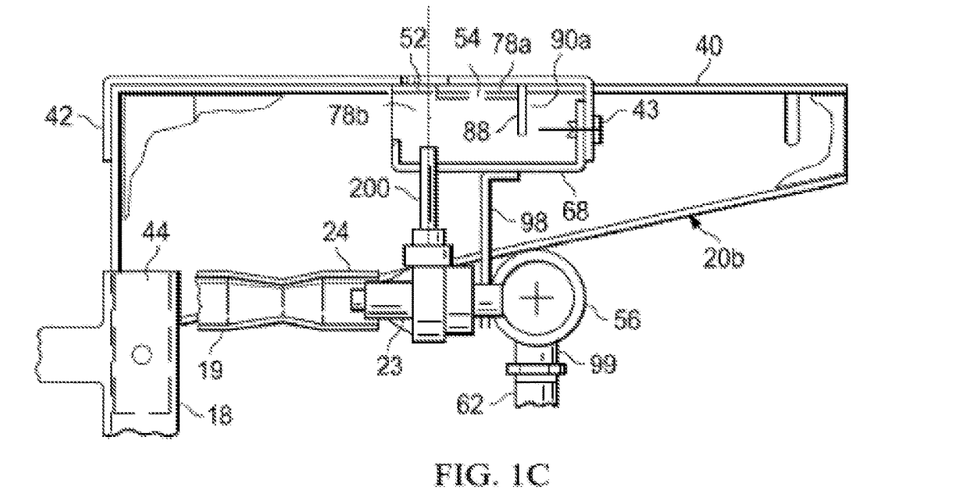

Referring to the Figures, certain aspects and embodiments of the gas grill and gas control valve of the present disclosure are described in greater detail beginning with reference FIGS. 1A, 1B and 1C which together depict an illustrative embodiment of a gas cooking grill. The gas control valve described herein may be used with configurations and embodiments of a gas grill other than that shown in the FIGURES herein. In addition, the concepts, teachings and invention described herein may be used in different types of apparatus, in addition to gas cooking grills, in which it is useful for the apparatus to have the ability to utilize one of two (or more) types of gas from a gas source.

FIGS. 1A, 1B and 1C illustrate one embodiment of a gas cooking grill 100 in accordance with the present disclosure. The various elements shown therein are described in U.S. Pat. No. 6,131,562, which is fully incorporated herein by reference, except as noted. These elements are readily understood by those skilled in the art. Most of the elements shown are available in conventional prior art gas cooking grills currently available from one or more manufacturers. Additionally, U.S. Pat. No. 8,613,276, issued on Dec. 24, 2013, filed May 23, 2011, having Ser. No. 13/113,423, and U.S. Pat. No. 7,967,005, issued on Jun. 28, 2011, filed Apr. 14, 2008, having Ser. No. 12/082,812, both entitled "DUAL FUEL GAS VALVE AND GAS GRILL," and invented by Daniel Parish, the inventor of the present application, show various features disclosed in the present application. U.S. Pat. No. 8,613,276 and U.S. Pat. No. 7,967,005, are also hereby incorporated by reference as if fully set forth herein.

Referring to the FIGS. 1A, 1B and 1C, there is shown a gas cooking grill 100 (gas barbeque grill assembly) including a gas supply system 10 and a gas manifold assembly 12. The gas cooking grill 100 shown includes a burner housing 16, a frame or support assembly 18 to support the burner housing 16, at least one burner 19 (a plurality), support members 20, and a work surface 22. For ease of reference, the remaining text description of the structure shown in FIGS. 1A, 1B and 10 are not set forth specifically below, but are incorporated herein by reference from U.S. Pat. No. 6,131,562.

The gas container or tank 58 herein may be either a gas tank which holds gas, such as liquid propane (LP), or a source of gas supply, such as from a natural gas supply system. Thus, the gas grill 100 may receive gas from an LP gas container 58, such as shown in FIG. 1A, or a natural gas (NG) supply system (not shown). In either case, the gas transfer line 62 will receive gas from a gas source. It will be understood that one of the benefits of the gas cooking grill 100 described herein provides duel fuel operation—the ability to operate either one of two (or possibly more) types of gas, such as LP or NG.

The gas cooking grill 100 includes a novel gas control valve 200. The gas control valve 200 is structured for a user to push the gas valve control knob to pass a substantially larger gas flow through the control valve 200 for searing meat, and for using different types of gas (e.g., LP, NG) from a gas source and control the flow of that particular type of gas from the source to the gas burners of the gas cooking grill 100. Gas control valve 200 is configured to receive gas flow from an inlet port (which delivers either type of gas) and controls and outputs the gas flow to an outlet port. As will be appreciated, utilization of either an LP gas or NG source necessitates different control and operating conditions. It will also be understood by those skilled in the art that the gas control valve may have various stem configurations in relation to the gas outlet port, such as a 90 degree configuration (as shown in FIGS. 1B and 1C), a 180 degree configuration (as shown in FIG. 2A-2E), or other angled configuration.

Now turning to FIGS. 2A through 2E, there is shown a perspective view, a top side view and various cross-sectional views (taken along section line C-C and section line D-D) of one embodiment of the gas control valve 200. The gas control valve 200 includes a valve body or valve housing 202 defining an interior cavity 248 that houses a valve core 204. A valve stem cap 206 is affixed to the housing 202 using one or more screws 216 and holds a valve stem 210 in place, as shown. The valve stem 210 is rigidly coupled to the valve core 204 for rotating therewith.

A restriction mechanism includes a stop extension 208 and a stop device 214 for restricting movement of valve stem 210. The valve stem cap 206 includes the stop extension 208 rigidly secured thereto, and the stop device 214 is removably secured to the valve stem 210. The stop extension 208 operates in conjunction with the stop device 214 to restrict rotational movement of the valve stem 210 (and hence the valve core 204) to a predetermined range, depending on the configurations of the stop extension 208 and/or the stop device 214. The valve stem 210 includes a valve stem knob extension 212 having a semi-circular shape for being received in an aperture in a burner knob 218. Various cross-sectional shapes and configurations may be used for the valve stem knob extension 212. When assembled, the valve core 204 rotates as the burner knob 218 rotates and the stop extension 208 and the stop device 214 function and operate together to restrict rotational movement to a predetermined range. It may be possible for the stop extension 208 and stop device 214 to be integrated into one component or constructed using multiple components.

In an alternative embodiment (not shown), the stop extension 208 and the stop device 214 are positioned internally within the stem cap housing 206 (and/or the valve housing 202), and operate in a similar fashion. However, for easier switching of the gas control valve 200 from a first mode for use with LG to a second mode of control and flow of different gas supplies, such as NG, it may be more beneficial for the stop extension 208 and the stop device 214 to remain externally located, as this may eliminate the need to remove the stem cap housing 206 from the housing 202 to accomplish mode switching.

Figure 2A:
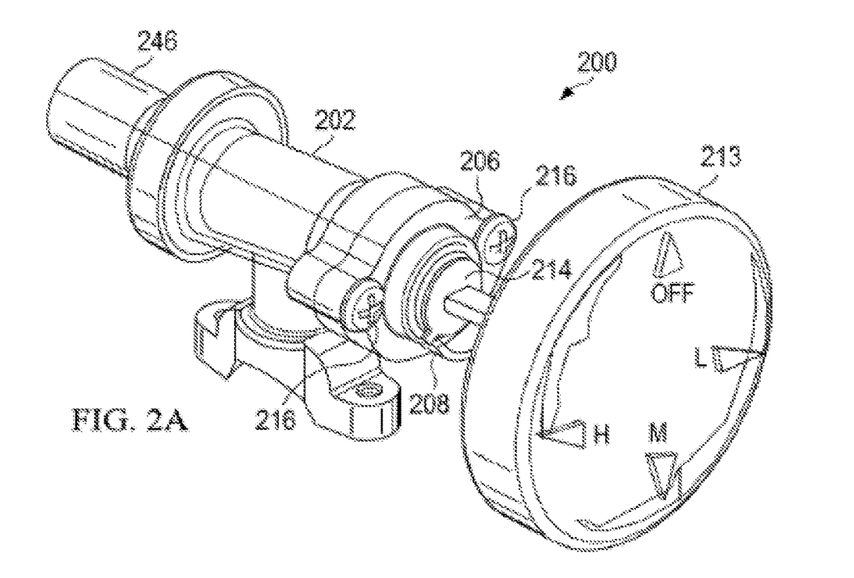
FIGS. 2A through 2E are perspective, side and cross-sectional views (taken along line section lines C-C and D-D), respectively, of one embodiment of a gas control valve in accordance with the present disclosure.
Figure 2B:
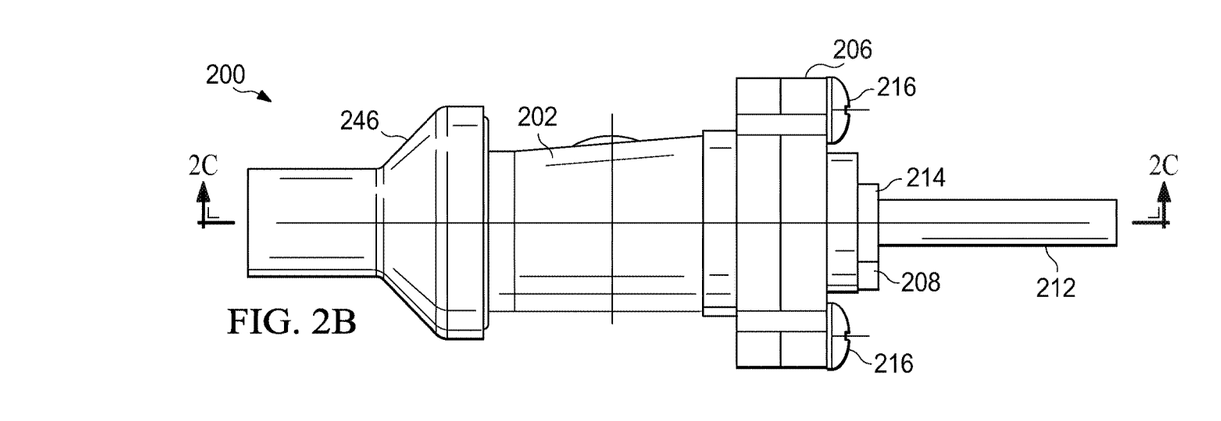
Figure 2C:
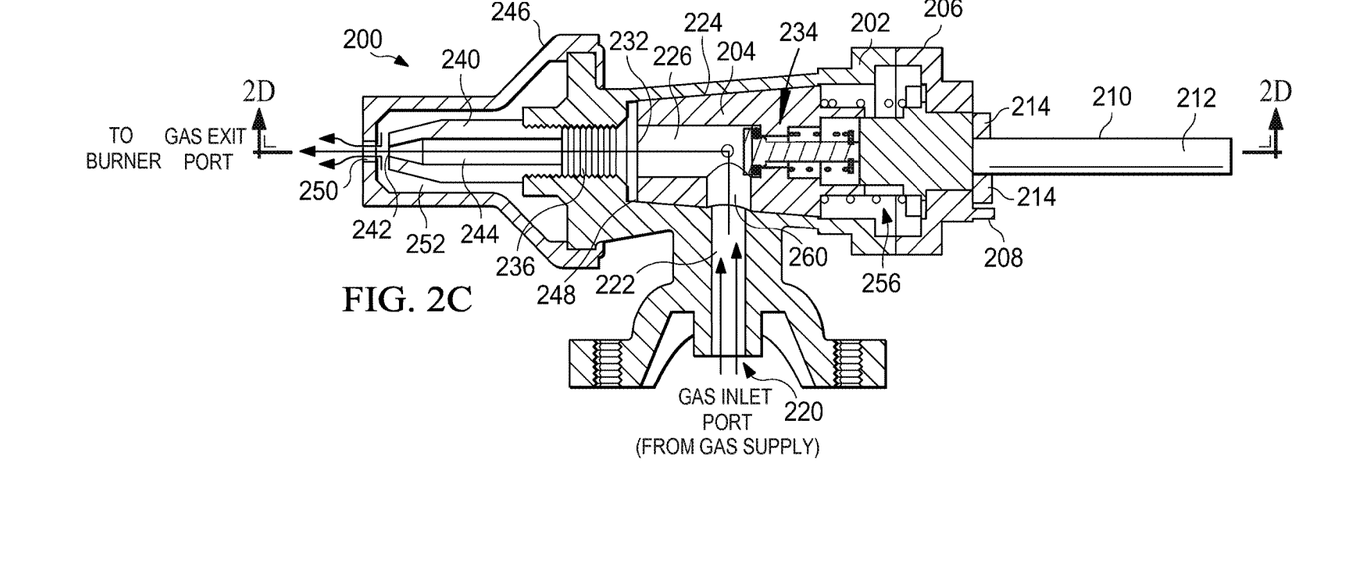

Referring to FIG. 2C, the valve housing 202 includes a gas inlet port 220 for receiving gas flow from a gas supply or container and a gas inlet passage (chamber) 222 for porting the inlet gas to the valve core 204. The valve core 204 has an exterior periphery 224 and an internal main gas flow chamber (passageway) 226. The valve core 204 also includes a first gas inlet port 258 for high rates of gas flow, a second gas inlet port 260 for intermediate rates of gas flow, a third gas inlet port 262 for low rates of gas flow in LP mode, a first main gas primary outlet port 232 and a by-pass outlet port 234. The housing 202 defines and includes a main gas outlet chamber 236. The main gas outlet chamber 236 receives gas flow from the main gas flow chamber 226 of the valve core 204.

An inner nozzle 240 having an orifice 242 is affixed (e.g., threads, press fit, etc.) to the housing 202 for receiving gas flow through an inner nozzle chamber 244 from the main gas outlet chamber 236. The inner nozzle 240 is typically a conventional gas nozzle operable for use with LP gas and the orifice 242 is sized and dimensioned for a given BTU burner size, for LP or NG. An outer nozzle 246 having an orifice 250 is coupled to the housing 202 for receiving gas flow through an outer nozzle chamber 252 from the by-pass chamber 238. The outer nozzle 246 is configured for use of the valve 200 in sear mode, and the orifice 250 is sized and dimensioned for a given BTU burner size for passing both the sear gas and the operating gas. The inner nozzle 240 is preferably replaced with a nozzle having a larger orifice in converting from use with LG to NG. The outer nozzle 246 has to be removed to replace the inner nozzle 240, such that in other embodiments the outer nozzle 246 is thrillingly secured to the valve housing 202 rather than being crimped onto the housing 202 as shown in FIGS. 2C-2E.

As shown, the outer nozzle 246 substantially surrounds the inner nozzle 240. The orifice 250 of the outer nozzle 246 is positioned adjacent, in line (e.g., longitudinally) and near with the orifice 242 of the inner nozzle 240. The orifice 250 is typically sized to be a larger cross-sectional area than the orifice 242, so as not to interfere with LP gas flowing through the inner nozzle 240. Preferably, the center of the orifices 242, 250 are positioned along a longitudinal centerline of the inner nozzle 240. Any offset (as well as positioning the orifices substantially far apart) may cause undesirable diffusion or diversion of the supply gas exiting the inner nozzle 240. As such, the outer nozzle 246 includes inner threads therein to threadingly mate with corresponding threads on the housing 202. This assists with positioning the orifice 250 and outer nozzle 246. In another embodiment, the outer nozzle 246 may be press fit to the housing 202. Other attachment or coupling mechanisms may be used. Other structural configurations of the outer nozzle 246 may also be used. The outer nozzle 246 (and orifice 250 and tip) provides a fixed orifice for use in delivering both the high flow setting gas and the sear gas. This nozzle 246 is preferably "fixed" in the sense that no removal or insertion of the nozzle tip, or changing of the orifice, is necessary in order for the grill 100 to switch between operating with only the high flow gas and the combined flow stream of both the high flow setting gas and the sear gas passing through the sear gas port 264. However embodiments of the valve 200 which are converted from liquid propane ("LP") for use with natural gas ("NG"), the valve nozzle 246 is preferably threadingly secured to the valve housing 202 to allow replacement of the inner nozzle 240 with a nozzle having an orifice sized for use with NG.

As the valve stem 210 and the valve core 204 are rotated, registration of the second gas inlet port 262 with the chamber 222 is reduced or enlarged, thereby providing the known multiple gas flow settings (OFF, HIGH, MED, LOW) for use with LP. When the valve 200 is used for NG, it is used in conjunction with the stop or restrictor device, described in additional detail below (and in FIGS. 4 through 7B), and then the valve stem 210 and the valve core 204 have a predetermined second range of rotational movement that translates into control of NG gas flow through the gas control valve 200, operable in gas flow settings of (OFF, HIGH, LOW).

Figure 2D:
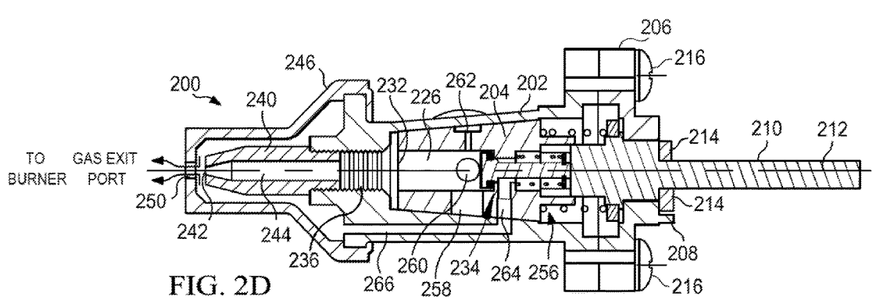
Figure 2E:
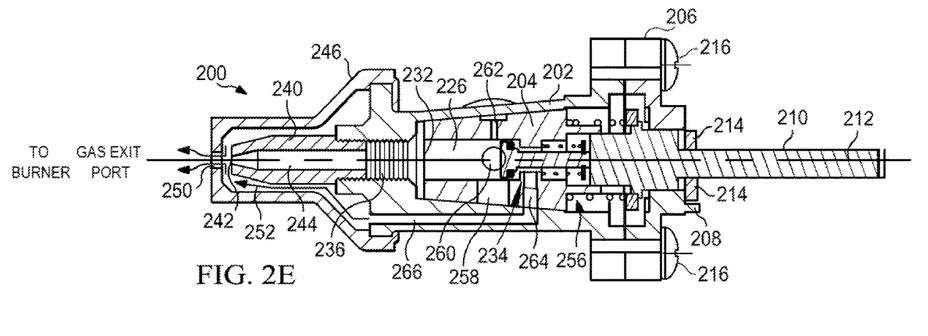
Figure 3:
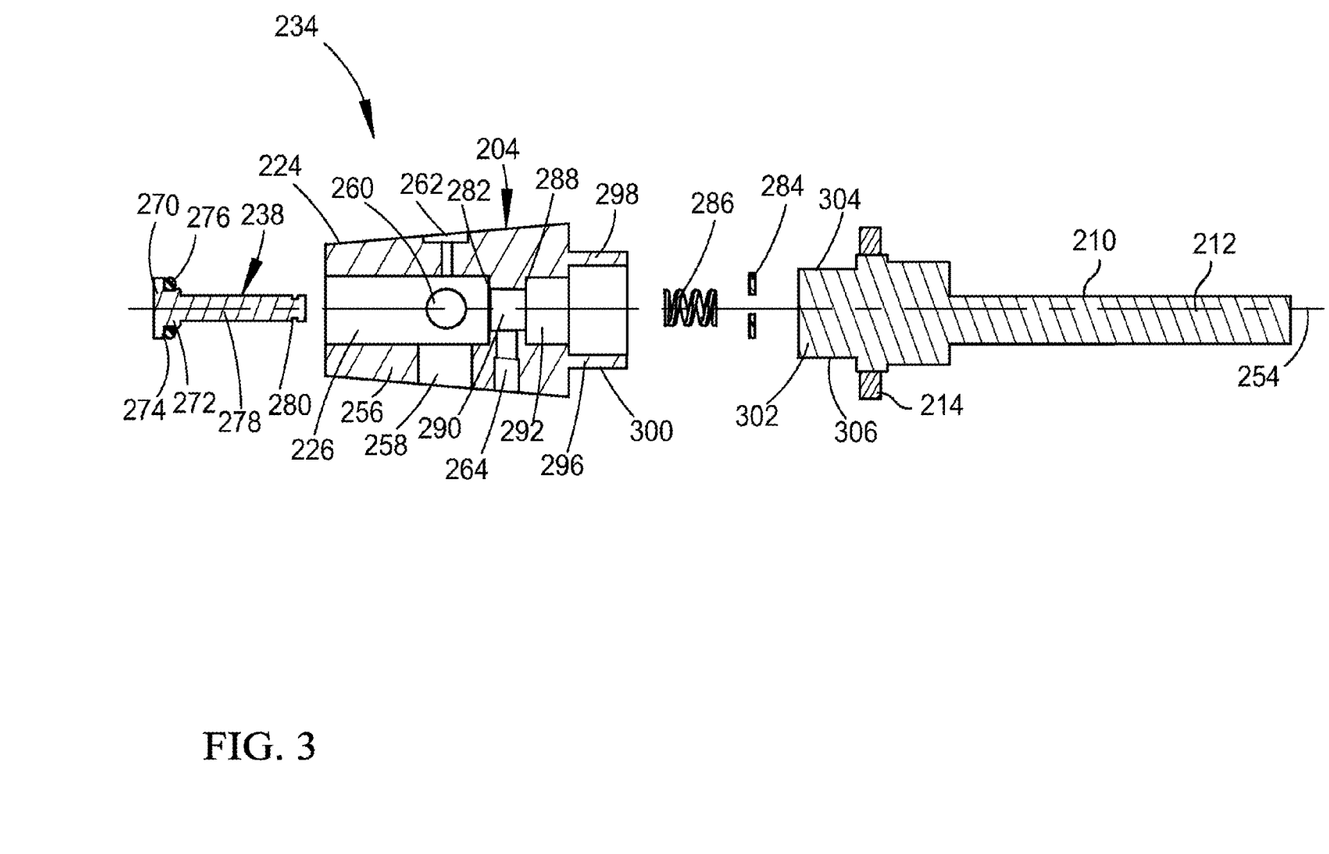
FIG. 3 is a partial, exploded, sectional view of the gas control valve of FIGS. 2A through 2F, taken along section line D-D.

FIGS. 2D, 2E are sectional views of the gas flow valve taken along section line D-D, and FIG. 3 is an exploded, longitudinal section view of the valve core 204 and the valve stem 210. The valve core 204 includes a main body 256, the sear gas port 264 formed into the main body 256, and the sear valve 234. The sear gas port 264 provides a secondary gas outlet port. The sear valve 234 includes a valve element 238 which provides a plunger member for selectively moving from a seal position (shown in FIG. 2D) to a sear gas flow position (shown in FIG. 2E). The valve element 238 has a head 270 on a forward end and an elongate body 278 which rearwardly extends from the head 270 to define a sear valve stem. An annular-shaped boss 272 extends from the elongate body 278 adjacent a rearward side of the head 270. An annular-shaped seal surface 274 is defined on the rearward side of the head 270, adjacent to the elongate body 278. A seal element 276 extends circumferentially around the boss 272 for selectively engaging between the seal surface 274 and an annular-shaped seal surface 282 on the main body 256 of the valve core 204. The seal element 276 is preferably formed of an elastomeric material and provide by an O-ring for a gasket. A groove 280 is circumferentially formed into a rearward end of the elongate body 278 for receiving a lock ring 284. The lock ring 284 provides a stop member which engages the rearward end of a bias spring 286. The bias spring 286 is preferably provided by a coil spring and provides a bias member. The bias spring 286 is compressed between the lock ring 284 which is mounted to the rearward end of valve element 238 and a rearward facing, annular-shaped surface 288 of the main body 256 of the valve core 204. The rearward facing surface 288 provides a bias spring stop.

The main body 256 of the valve core 204 has a plurality of apertures which are aligned along a central longitudinal axis 254 of the gas valve 200. The main chamber 226 is disposed adjacent to an inner aperture 290, which is preferably disposed rearward of the gas flow ports 258, 260 and 262. The inner aperture 290 is preferably disposed radially adjacent to the sear gas port 264. A rear aperture 292 is disposed adjacent to and rearward of the inner aperture 290. The main chamber 226, the inner aperture 290, and the rear aperture 292 are preferably concentrically and coaxially disposed about the longitudinal axis 254. A yoke 296 is disposed on a rearward terminal end of the main body 256, and has two arms which extend rearward from the main body 256 for receiving a forwardly protruding tang of the valve stem 210 to couple the valve core 204 for rotating with the valve stem 210. The tang 302 has two flats 304 and 306 which slidably engage between the arms 298 and 300 of the yoke, for sliding relative to a longitudinal direction, parallel to the longitudinal axis 254.

In operation, the valve element 238 is secured as shown in FIGS. 2D and 2E, slidable within the main body portion 256 along the longitudinal axis 254 of the valve core 204. The valve core 204 is coupled with the valve stem 210 for rotating about the longitudinal axis 254, with the valve stem 210 moveable for pushing the valve element 238 outward from the forward end of the inner aperture 290. The bias spring 286 is compressed between the lock ring 284 and the stop surface 288 for pushing the valve element 238 toward a rearward position, as show in FIG. 2D, with the seal element 276 compressed between seal surface 288 and the seal surface 274. A user will push the valve stem 210 in a forward direction, pushing the valve element 238 forward to disengage the seal element 276 from sealing engaging between the seal surfaces 274 and 282. This allows for sear gas to flow through the gas inlet port 220, into the main chamber 226, and outward through the 290 inner aperture and the sear gas port 264 to sear gas flow passage 266. The flow passage 266 extends to the outer nozzle chamber 252. After a sear gas charge is passed into the grill 100 for combustion, the user will release pressure from pushing the valve stem 210 in a forward direction and the bias spring 286 will return the valve element 238 to a rearward position with the seal element 276 sealingly engaging between the valve element 238 and the main body 256 of the core 204. The seal element 276 will then prevent gas from flowing through the sear gas port 264.

The sear gas flow will preferably provide a gas flow to the grill burner which is at least double the flow of gas which is passed through the high flow port 258. For example, if the supply gas flowing through the high flow port 258 at a rate of 10,000 BTU, then the sear gas will be provided to flow through the sear gas port 264 at a rate of 12,500 BTU. The combined flow stream will provide a total gas supply to the grill burner of 22,500 BTU for searing. For providing these rates of flow, the orifice 242 of the inner nozzle may be provided in a size ranging from 7 thousands of an inch (0.007 inches) to twelve thousands of an inch (0.012 inches). The outer orifice 250 for the outer nozzle 246 could then be sized at approximately twenty three thousands of an inch (0.023 inches). Preferably the high flow port 258 and the sear gas port 264 are radially aligned to simultaneously register with, that is to simultaneously line up with, respective ones of the gas inlet passageway 222 and the sear gas flow passage 266 with a selected angular alignment of the valve core 204 with the vale housing 202. This provides for flow through both the high flow port 258 and the sear gas port 264 for searing meat.

Figure 4:
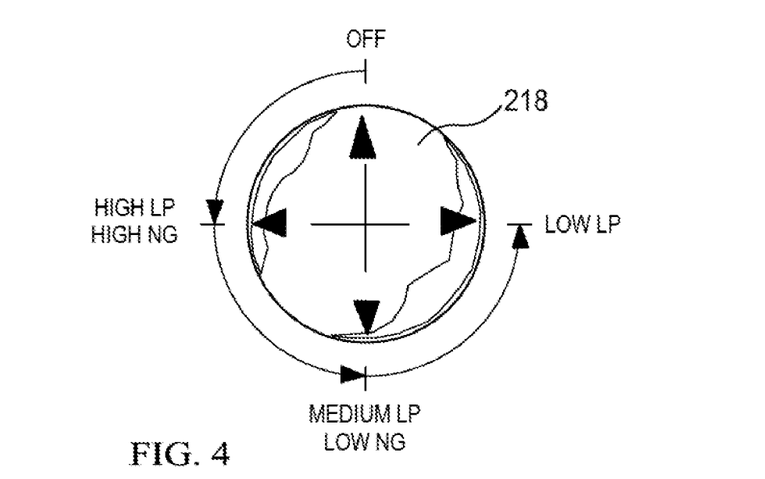
FIG. 4 is a side elevation view of a burner knob for the gas valve which illustrates operating positions for the gas control valve.
Figure 5A:
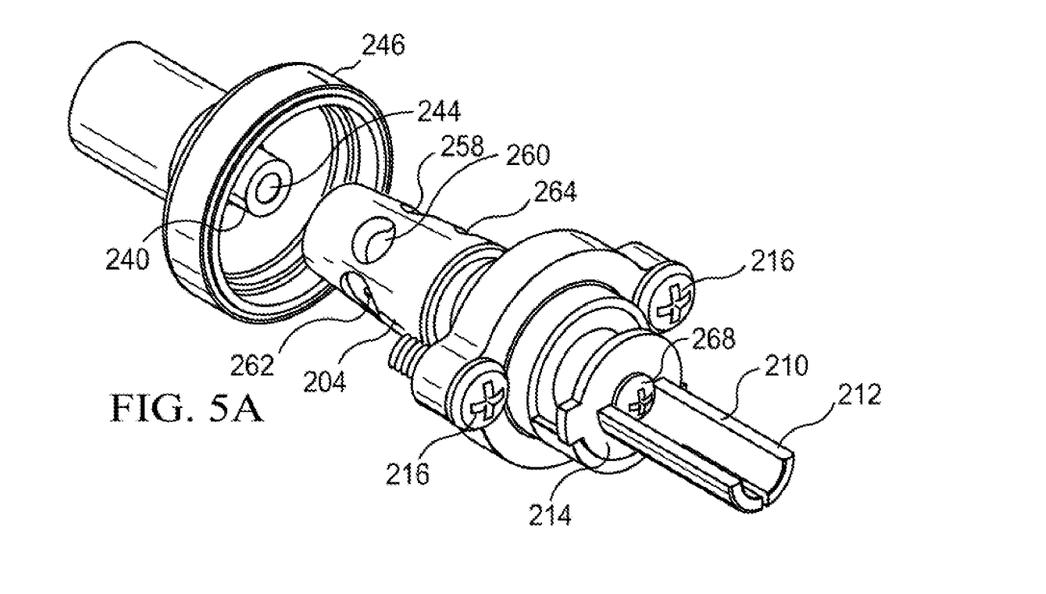
FIG. 5A is a partially exploded, perspective view of the gas valve excluding its housing and outer flow nozzle.
Figure 5B:
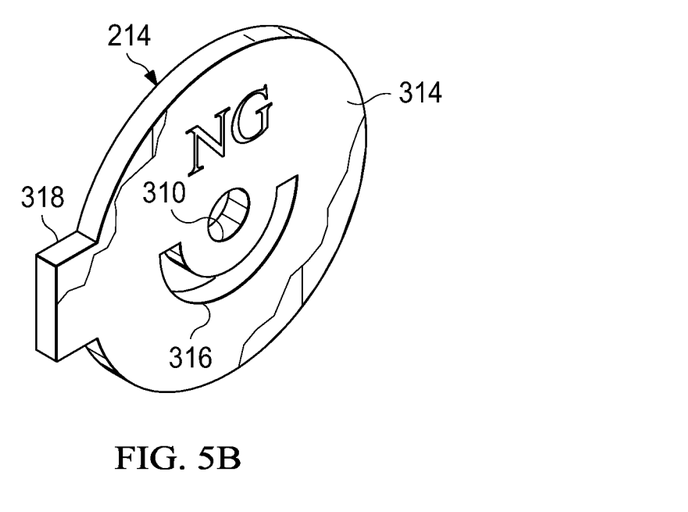
FIGS. 5B and 5C are views of a stop device for use with the gas valve for adapting the gas valve for use with natural gas.
Figure 5C:
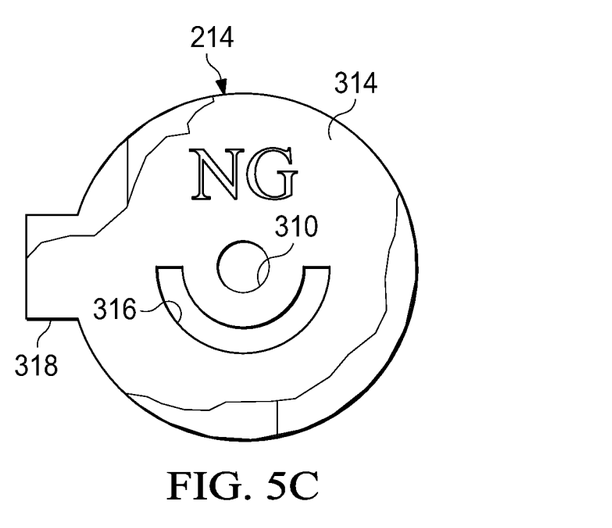

Now referring to FIG. 4, there is shown a range of positions or movement for the gas control valve 200 when used with the stop device 214 (and stop extension 208) shown in FIGS. 5A through 5C. As shown, in the LP configuration, the knob 218 (and valve core 204) may be rotated along a first rotational range of movement ranging from the OFF position through setting 1 (HIGH LP), setting 2 (MEDIUM LP), and setting 3 (LOW LP). In the NG configuration, the knob 218 (and valve core 204) may be rotated along a second rotational range of movement which ranges from the OFF position, to the setting 1 (HIGH NG), and setting 2 (LOW NG, which is also MEDIUM for LG). As will be appreciated, the gas flow operation and the settings configuration depend on the structural arrangement of the gas valve core 204 of the gas control valve 200.

Now referring to FIG. 5A, there is shown a perspective view of the gas valve 200 excluding the housing 202 (and nozzle 240) utilizing the stop device 214 shown in FIGS. 5B and 5C. FIGS. 5B and 5C are a perspective view and a front view of the stop device 214. The stop device 214 is preferably substantially circular in shape and relatively flat. The stop device 214 includes a main body 314, an aperture or hole 310 for receiving a screw (not shown), a valve stem burner extension groove or slot 316, and a stop extension end or tab 318 extending outward from the main body of the stop device 214. As will be appreciated, the stop extension end 318 functions with the stop extension 208 of the valve stem cap 206 to restrict movement. The slot 316 is configured to substantially match the cross-sectional shape and configuration of the valve stem knob extension 212. The stop 214 is stamped with the nomenclature "NG" for use with natural gas. The aperture 316 (shown in FIGS. 5B and 5C) is configured for receiving the valve stem knob extension 212 in a non-rotatable interfitting relation such that stop device 214 is non-rotatable in relation to the valve stem extension 212. Both the valve stem extension 212 and the aperture 316 are shaped for interfitting.

Figure 6A:
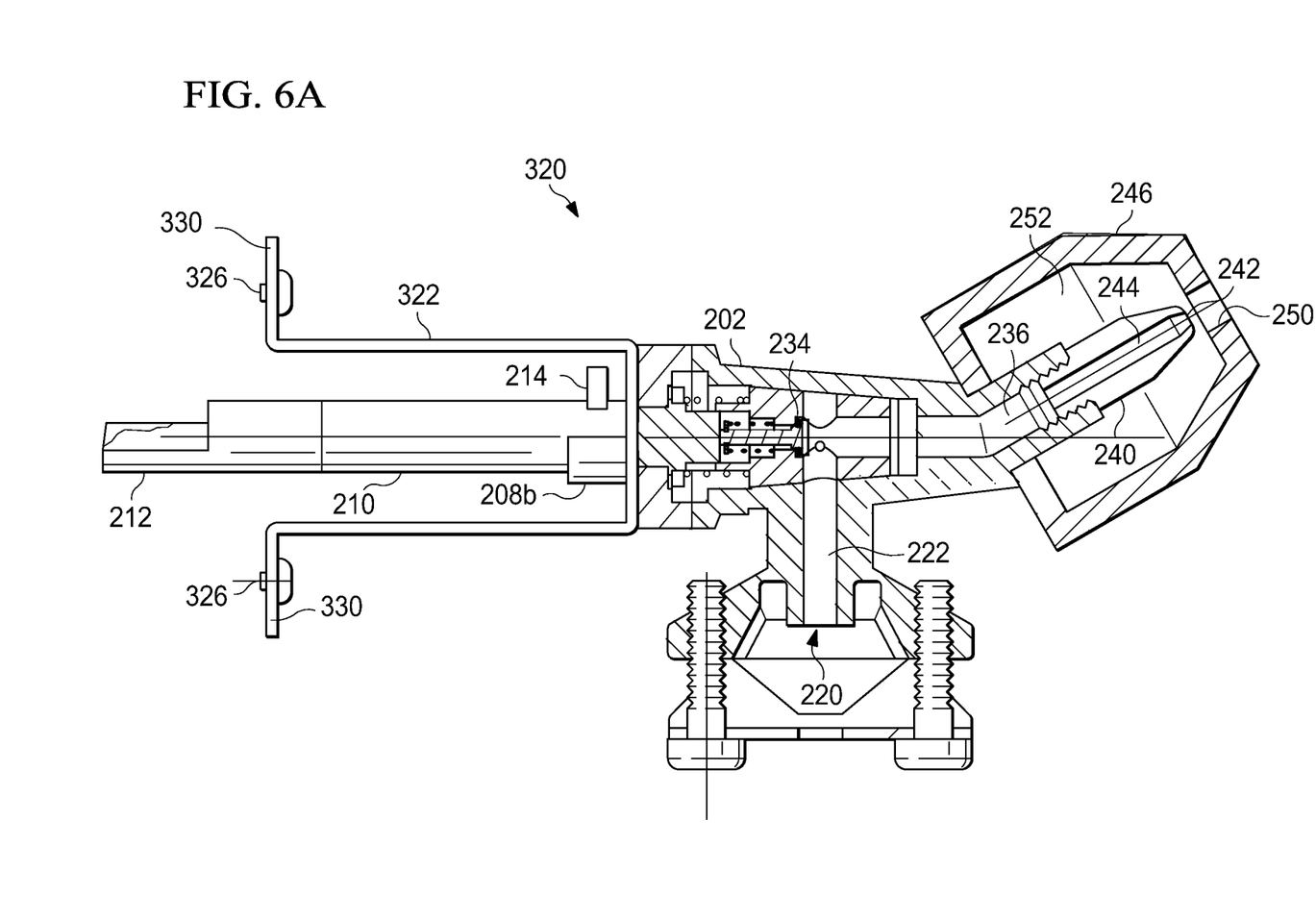
FIG. 6A is cross-sectional view of another embodiment of a gas control valve in accordance with the present disclosure.

Now referring to FIG. 6A, there is shown a different embodiment or configuration of a gas control valve 320 in accordance with the present disclosure. Gas control valve 320 includes various similar elements as set forth in FIGS. 2A-2E, and FIG. 3, as noted. FIG. 6A illustrates that the concepts and teachings of the present disclosure may be used within gas valves having differing structural configurations.

As noted previously, the stop extension 208 may be integrated into the valve stem cap 206, or other shapes or structures may be utilized, to provide such function. In FIG. 6A, the gas control valve 320 is shown secured to a gas valve mounting bracket 322 that includes a stop device 208b (may be affixed or attached to or integrated with the bracket 322). While gas valve 320 is shown, the gas valve 200 or other configurations of gas valves may be utilized in this embodiment. The bracket 322 includes an aperture 328 for receiving the valve stem knob extension 212 there-through. Two apertures 324 are included to receive screws (not shown) for operably attaching the bracket to the gas valve 320. Other structures, means or methods known to those skilled in the art may be used for securing the bracket 322 to the gas valve 320. Outer flanges 330 of the bracket 322 include two apertures 326 with internal threading to receive screws (not shown) for operably attaching the bracket 322 to the gas grill body (such as a burner knob face plate). When attached, its position is fixed relative to the position of the gas control valve 320. Other structures and methods may be utilized.

In another embodiment (not shown), the bracket 322 and the gas valve 320 may each be independently secured to an intermediate mounting member (not shown), allowing for removal and repositioning of the bracket 322 from the intermediate mounting member without the necessity of removing the gas valve 320 from such mounting member (but still provided when attached, its position is fixed relative to the position of the gas control valve 320). This allows for repositioning of the bracket 322 while leaving the gas valve 310 secured to the body of the gas grill 100. Thus, the stop device 208b provides a removable restrictor mechanism.

Figure 6B:
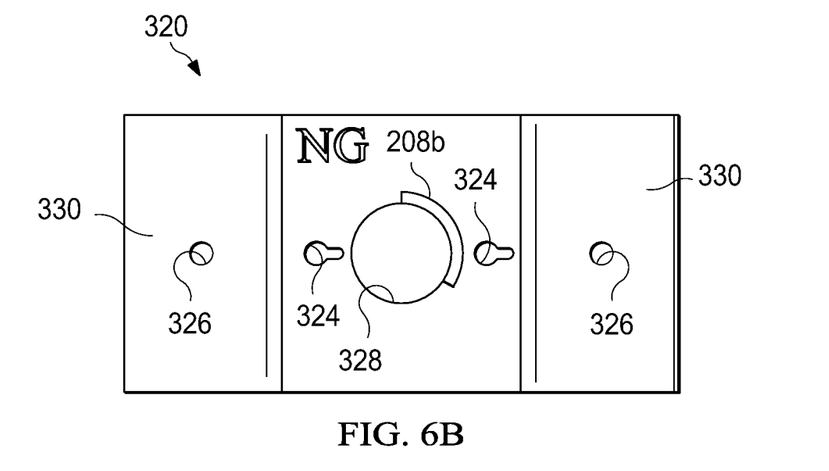
FIGS. 6B and 6C are front and perspective views of an alternative embodiment of a removable restrictor device.
Figure 6C:
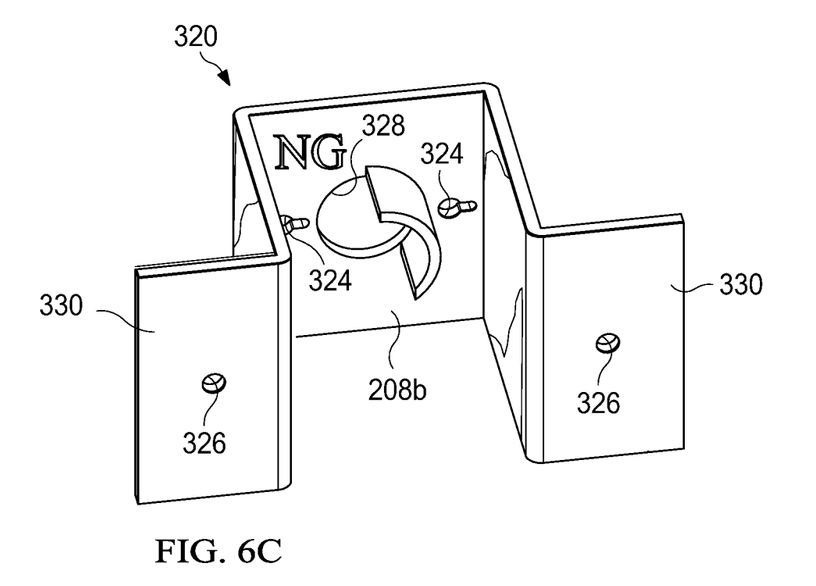

Now referring to FIGS. 6B and 6C, there are shown front and perspective views of the bracket 322. In the embodiment shown, the stop device 208b is constructed of a generally arcuate semi-circle shape (e.g., about or substantially 120 degrees). Other shapes and structures may be utilized, and in another embodiment, the stop device 208b may include one or two separate posts or extensions extending outward from the bracket 322. Similarly, the stop extension 214 is structured correspondingly to the structure of the stop device 208b to provide the desired operation and functioning described herein. Mounting holes 324 and 326 are provided for securing the bracket 322 to the frame of the grill 100.

Figure 7A:
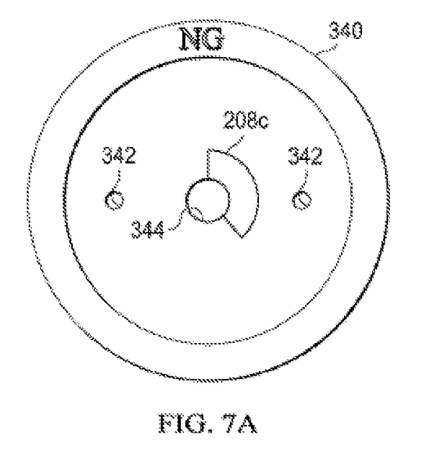
FIGS. 7A and 7B are front and perspective views of another embodiment of a removable restrictor device.
Figure 7B:
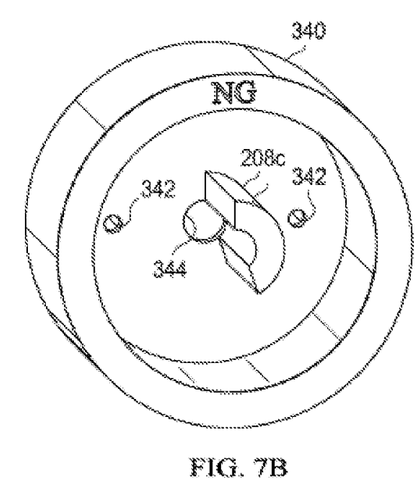

Now referring to FIGS. 7A and 7E, there are shown front and perspective views of an alternative embodiment, in the form of a gas knob bezel 340, that may be substituted or utilized in place of the above-described bracket 322. In the embodiment shown, the bezel 340 includes a stop device 208c constructed of a generally arcuate semi-circle shape (e.g., about or substantially 120 degrees). Other shapes and structures may be utilized, and in another embodiment, the stop device 208c may include one or two separate posts or extensions extending outward from the bezel 340. Similarly, the bezel 340 may be utilized in conjunction with the same or a similar stop extension 208b as described in conjunction with the bracket embodiment.

The bezel 340 includes an aperture 344 for receiving the valve stem 212 there-through. Two apertures 342 are included to receive screws (not shown) for operably attaching the bezel to the gas valve 320 or the gas grill body (such as a burner knob face plate). Other structures, means or methods known to those skilled in the art may be used for securing the bezel 340 to the gas valve 320 or gas grill body.

Additionally, the bracket 322 (or bezel 340) may include one or more designations (e.g., "NG") that indicate the correct orientation of the bracket 322 (or bezel 340) when the gas grill 100 (and the gas control valve 200, 320) is used with a gas source supplying NG. A consumer or other person may operably configure the gas grill 100 for the selected fuel or gas supply by removing the bracket 322 (or bezel 340), orienting the gas grill 100 for LP or NG use, and replacing the bracket 322 (or bezel 340) for NG use. The designation "NG" (or other similar designation) may be stamped, etched or otherwise affixed to the bracket 322 (or bezel 340) in visible form, as shown in FIGS. 6B, 6C, 7A and 7B. Thus, the stop device 208b is removably affixed in a first position or a second position and fixed in those positions relative to the gas control valve body (or valve core).

In general operation, the gas cooking grill 100 can be used to sear meats by pushing the control knob of a gas control valve used to control the gas supply to the grill. The valve is provided with features for a user to configure the grill for operating in either LP or NG mode. In LG mode, three valve ports are provided: high, medium and low. For NG mode, only the high port and the medium port are used, with a restrictor provided to prevent operation of the valve using the lower flow gas supply port. The restrictor mechanism is preferably removed or de-installed to allow gas supply through the low flow in LG mode.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the preferred embodiment has been described in detail, it should be understood that various changes, substitutions and alterations can be made therein without departing from the spirit and scope of the invention as defined by the appended claims.

What is claimed is:

1. A gas control valve comprising:
   a valve housing having an interior cavity, a first inlet port operable for receiving gas from a gas source, an inlet passage extending from said first inlet port to said interior cavity, a primary outlet port extending from said interior cavity, and a sear gas flow passage extending from said interior cavity to a forward end of said housing, wherein said inlet passage, said primary outlet port and said sear gas flow passage are spaced apart at said interior cavity;
   a valve core having an exterior periphery and main chamber which is disposed interiorly within said valve core, at least one gas inlet port extending from said exterior periphery to said main chamber, a gas outlet port extending from said main chamber to said exterior periphery, wherein said valve core is mounted within said valve housing such that said valve core is selectively moveable within said valve housing for aligning said at least one gas inlet port with said inlet passage;
   a sear valve disposed relative to one of said valve core and said valve housing for controlling a sear gas flow through said gas flow passage, said sear valve having a valve element which is selectively movable from a first position to a second position, wherein in said first position said valve element prevents said sear gas flow through said sear gas flow passage, and in said second position said valve element is disposed such that said sear gas flow passes through said sear flow passage, and said sear valve further including a bias member for urging said valve element to said first position; and
   wherein a user selectively operates said sear valve to move said valve element from said first position to said second position and said sear gas flow passes through said sear gas flow passage to said forward end of said valve housing.

2. The gas control valve according to claim 1, wherein said sear valve is disposed within said valve core and further comprises:
   said valve element having a head, an elongate body, and a seal element disposed adjacent of said head and said elongate body for engaging with a seal of said valve core; and
   a stop member fixed on said elongate body for limiting a range of movement for said valve element within said valve core and said valve housing.

3. The gas control valve according to claim 2, wherein said bias member is a coil spring extending about said elongate body of said valve element, and disposed between said stop member and a stop.

4. The gas control valve according to claim 1, further comprising:
   an inner nozzle mounted to said valve housing adjacent to said primary outlet port and having a first orifice for outputting gas flowing from said primary outlet port;
   an outer nozzle mounted to said valve housing adjacent to said inner nozzle, said outer nozzle having a second orifice for outputting gas flowing from said primary outlet port and said sear gas flow passage; and
   wherein said second orifice is disposed adjacent to said first orifice.

5. The gas valve according to claim 1, further comprising:
   a stop extension disposed in fixed relation to said valve housing;
   a stop device for restricting movement of the valve core from a first predetermined range in a first mode of operation and to allow a second predetermined range in a second mode of operation,
   wherein said stop device has a main body which is coupled to said valve core for moving with said valve core, and said stop device further includes a stop tab extending from said main body for engaging said stop extension to prevent movement outside of said second predetermined range.

6. The gas control valve according to claim 5, wherein said stop device is removably secured to a valve stem rigidly which is coupled to said valve core, and said stop device moves in association with said valve stem to thereby move with said valve core.

7. The gas control valve according to claim 5, wherein said first mode of operation is a liquid propane mode and the second mode of operation is a natural gas mode.

8. A gas control valve comprising:
   a valve housing having an interior cavity, a first inlet port operable for receiving gas from a gas source, an inlet passage extending from said first inlet port to said interior cavity, a primary outlet port extending from said interior cavity, and a sear gas flow passage extending from said interior cavity to a forward end of said housing, wherein said inlet passage, said primary outlet port and said sear gas flow passage are spaced apart at said interior cavity;
   a valve core having a main body which includes an exterior periphery and a main chamber which is disposed interiorly within said main body of said valve core, at least one gas inlet port extending from said exterior periphery to said main chamber, a gas outlet port extending from said main chamber to said exterior periphery, and a sear gas port extending from said main chamber to said exterior periphery, wherein said valve core is mounted within said valve housing such that said valve core is selectively rotatable within said valve housing for aligning said at least one gas inlet port with said inlet passage and aligning said sear gas port with said sear gas flow passage;
   a sear valve disposed within said valve core for controlling a sear gas flow from within said valve core, said sear valve having a valve element which is selectively movable in slidable relation to said valve core from a first position to a second position, wherein in said first position said valve element prevents said sear gas flow from said main chamber of said valve core through said sear gas port, and in said second position said valve element is disposed such that said sear gas flow passes from said main chamber through said sear gas port and said sear gas flow passage to said forward end of said valve housing, and said sear valve further including a bias member for urging said valve element to said first position; and
   wherein a user selectively moves said valve element from said first position to said second position to thereby pass said sear gas flow from said main chamber, through said sear gas port and said sear gas flow passage to said forward end of said valve housing.

9. The gas control valve according to claim 8, wherein said sear valve further comprises:
   said valve element having a head, an elongate body, and a seal element disposed adjacent said head and said elongate body for engaging with a seal surface disposed in fixed relation to said main body of said valve core;
   a stop ring fixed on said elongate body for limiting a range of movement for said valve element within said valve core.

10. The gas control valve according to claim 9, wherein said bias member is a coil spring extending about said elongate body of said valve element, and disposed between said stop ring and a stop defined by said main body of said valve core.

11. The gas control valve according to claim 8, further comprising
   an inner nozzle mounted to said valve housing adjacent to said primary outlet port and having a first orifice for outputting gas flowing from said primary outlet port;
   an outer nozzle mounted to said valve housing adjacent to said inner nozzle, said outer nozzle having a second orifice for outputting gas flowing from said primary outlet port and said sear gas flow passage; and
   wherein said second orifice is disposed adjacent to said first orifice.

12. The gas valve according to claim 8, further comprising:
   a stop extension disposed in fixed relation to said valve housing;
   a stop device for restricting movement of the valve core from a first predetermined range in a first mode of operation and to allow a second predetermined range in a second mode of operation, wherein said stop device has a main body which is coupled to said valve core for rotating with said valve core, and said stop device further includes a stop tab radially extending from said main body for engaging said stop extension to prevent movement outside of said second predetermined range.

13. The gas control valve according to claim 12, wherein said stop device is removably secured to a valve stem rigidly which is coupled to said valve core, and said stop device moves in association with said valve stem to thereby move with said valve core.

14. The gas control valve according to claim 12, wherein said first mode of operation is a liquid propane mode and the second mode of operation is a natural gas mode.

15. A gas grill comprising:
   a plurality of gas burners;
   a plurality of gas control valves for passing the gas to respective ones of said plurality of gas burners for combusting;
      wherein each of said control valves has a valve housing which includes an interior cavity, a first inlet port operable for receiving gas from a gas source, an inlet passage extending from said first inlet port to said interior cavity, a primary outlet port extending from said interior cavity, and a sear gas flow passage extending from said interior cavity to a forward end of said housing, wherein said inlet passage, said primary outlet port and said sear gas flow passage are spaced apart at said interior cavity,
   a valve core disposed in each of said control valves, respectively, each of said valve cores having an exterior periphery and main chamber which is disposed interiorly within said valve core, at least one gas inlet port extending from said exterior periphery to said main chamber, a gas outlet port extending from said main chamber to said exterior periphery, and a sear gas port extending from said main chamber to said exterior periphery, wherein said valve core is mounted within said valve housing such that said valve core is selectively moveable within said valve housing for aligning said at least one gas inlet port with said inlet passage and aligning said sear gas port with said sear gas flow passage;
   each said valve core having a sear valve disposed relative to a respective said valve core for controlling a sear gas flow from within said valve core, said sear valve having a valve element which is selectively movable relative to said valve core from a first position to a second position, wherein in said first position said valve element prevents said sear gas flow from said main chamber of said valve core through said sear gas port and said sear gas flow passage, and in said second position said valve element is disposed such that said sear gas flow passes from said main chamber through sear gas port and said sear flow passage, and said sear valve further including a bias member for urging said valve element to said first position; and wherein a user selectively operates said sear valve to move said valve element from said first position to said second position to passing said sear gas flow from said main chamber, through said sear gas port and said sear gas flow passage to said forward end of said valve housing.

16. The gas control valve according to claim 15, wherein said sear valve is disposed within said valve core and further comprises:
said valve element having a head, an elongate body, and a seal element disposed adjacent said head and said elongate body for engaging with a seal surface disposed in fixed relation to said valve core; and
a stop member fixed on said elongate body for limiting a range of movement for said valve element within said valve core.

17. The gas control valve according to claim 16, wherein said bias member is a coil spring extending about said elongate body of said valve element, and disposed between said stop member and a stop defined in fixed relation to said valve core.

18. The gas control valve according to claim 15, further comprising:
an inner nozzle mounted to said valve housing adjacent to said primary outlet port and having a first orifice for outputting gas flowing from said primary outlet port;
an outer nozzle mounted to said valve housing adjacent to said inner nozzle, said outer nozzle having a second orifice for outputting gas flowing from said primary outlet port and said sear gas flow passage; and
wherein said second orifice is disposed adjacent to said first orifice.

19. The gas valve according to claim 15, further comprising:
a stop extension disposed in fixed relation to said valve housing;
a stop device for restricting movement of the valve core from a first predetermined range in a liquid propane mode of operation and to allow a second predetermined range in a natural gas mode of operation, wherein said stop device has main body which is coupled to said valve core for moving with said valve core, and said stop device further includes a stop tab extending from said main body for engaging said stop extension to prevent movement outside of said second predetermined range.

20. The gas control valve according to claim 19, wherein said stop device is removably secured to a valve stem rigidly which is coupled to said valve core, and said stop device moves in association with said valve stem to thereby move with said valve core.

* * * * *